SELF RESETTING COUNTER CIRCUIT
Filed Oct. 20, 1960
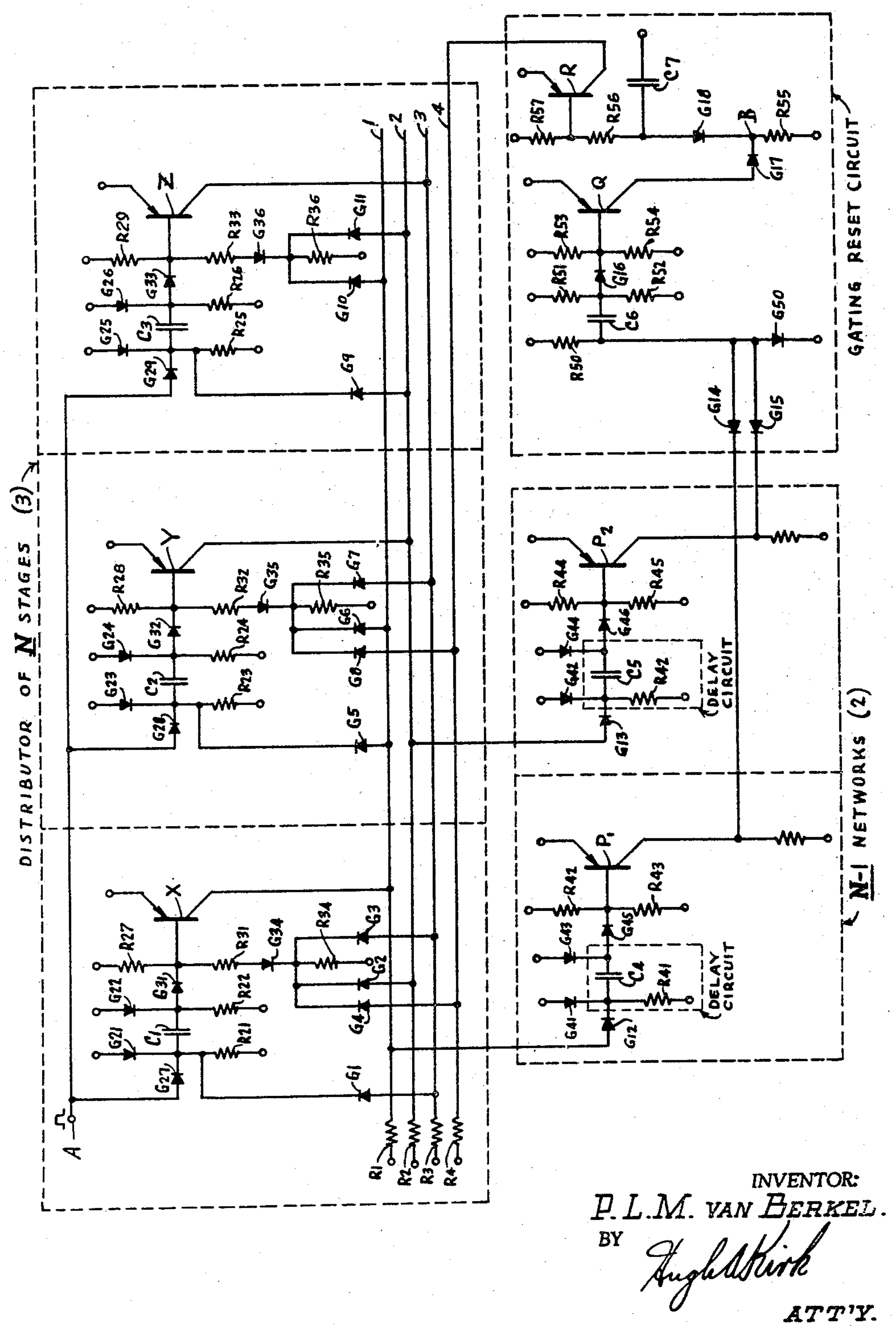
INVENTOR:
P. L. M. VAN BERKEL.
BY
ATT'Y.

3,183,367
Patented May 11, 1965

1

3,183,367

SELF RESETTING COUNTER CIRCUIT

Petrus Ludovicus Maria van Berkel, Voorburg, Netherlands, assignor to De Staat der Nederlanden, ten deze vertegenwoordigd door de Directeur-Generaal der Posterijen, Telegrafie en Telefonie, The Hague, Netherlands Filed Oct. 20, 1960, Ser. No. 63,741
Claims priority, application Netherlands, Oct. 30, 1959, 244,911
6 Claims. (Cl. 307—88.5)

The invention relates to a counter having $n$ stages each containing an element having two conductive states, each state of the counter exhibiting a specified distribution of the conductive states of the elements, which counter is returned to its initial state in case an input pulse out of a series of $n$ pulses fails to appear, because in such a case a gating circuit lets pass a reset pulse in order to effect the distribution of conductive states corresponding to this initial state.

Such a counter is known from the British Patent Number 587,655, completely accepted May 1, 1947. In this counter a separate generator ensures the generation of the reset pulses. Measures had to be taken further, in order that the generator pulses and the input pulses of the series appear synchronously. The circuit is only usable, if the intervals between two successive input pulses are of uniform length and if enough pulses are available to realize said synchronism. Further the succession of the various series will have to be such that this synchronism need not be adjusted again for every new series.

According to the invention the above-mentioned disadvantages are removed in such a way that the input terminal of a network also containing an element having two conductive states is connected to each of the output terminals of at the most $n-1$ successive stages, in such a way that the element in such a network changes its conductive state as soon as the conductive state of the element in the associated stage changes in a certain sense, the element in the network reassuming after a delay the original conductive state, and that moreover the output terminals of the networks are so connected to the input terminals of the gating circuit that the reset pulse resulting from the said return to the original conductive state of the element in the network is only allowed to pass, if in none of the other networks the element is in the other conductive state.

Such a counter or distributor provided with a discriminator against isolated pulses or pulse pairs can e.g. be used in a scanning device for a registration bearer according to the U.S. patent application 828,646 filed July 21, 1959. This registration bearer is provided with three marking stripes above and/or below each of the figures to be scanned, there figures being scanned in the upper half as well as in the lower half in the three successive places indicated by the marking stripes. The information bits thus obtained from each figure are stored successively in 3 x 2 memory circuits by means of a distributor having three stages. By providing networks according to the invention, the distributor is protected against pulses originating from the edge of the paper, folds in the paper, perforations, etc., i.e. after such disturbances the distributor returns to the initial state, in order to ensure the recording of the bits of the next figure in the right way.

The invention will be described in detail, reference being had to the annexed drawing, which shows a schematic wiring diagram of an embodiment of the invention for a distributor in which the $n$ number of stages are three and the associated $(n-1)$ networks are two; the stages and networks containing pnp transistors.

The distributor stages contain transistors X, Y and

2

Z, of which: the emitters are connected to points of fixed potential; the collectors via conductor rails 1, 2 and 3, respectively, and via separate resistors $R_1$, $R_2$ and $R_3$ to points of fixed potential; and the bases each to a separate circuit. Each such separate circuit contains a capacitor, $C_1$, $C_2$ and $C_3$, respectively, both plates of which are connected to both a rectifier $G_{21}$–$G_{22}$, $G_{23}$–$G_{24}$, and $G_{25}$–$G_{26}$ and on the other hand to a resistor $R_{21}$–$R_{22}$, $R_{23}$–$R_{24}$, and $R_{25}$–$R_{26}$ to points of fixed potential. Moreover the left-hand plates of these three capacitors are connected via separate rectifiers $G_{27}$, $G_{28}$ and $G_{29}$, respectively to the input terminal A of the distributor and via separate rectifiers, $G_1$, $G_5$ and $G_9$, respectively, to conductor rails 3, 1 and 2. The right-hand plates of these three capacitors $C_1$, $C_2$ and $C_3$ are each connected via a separate rectifier $G_{31}$, $G_{32}$ and $G_{33}$ to the base of the associated transistors X, Y and Z, respectively, this base also being connected on one hand via a resistor $R_{27}$, $R_{28}$ and $R_{29}$ to a point of fixed potential and on the other hand via resistors $R_{31}$, $R_{32}$ and $R_{33}$ and rectifiers $G_{34}$, $G_{35}$ and $G_{36}$ to a point which is connected in its turn via resistors $R_{34}$, $R_{35}$ and $R_{36}$ to a point of fixed potential and via rectifiers $G_2$ and $G_3$, $G_6$ and $G_7$, and $G_{10}$ and $G_{11}$, respectively, to conductor rails 2 and 3, 1 and 3, and 1 and 2, respectively, but moreover as far as transistors X and Y are concerned, via a rectifier, $G_4$ and $G_8$, respectively, to a rail conductor 4.

In introducing the networks according to the invention, it has been started from that the initial state of the distributor, that is, the state in which transistors X and Y are non-conducting and transistor Z is conducting. Now the stages containing transistors X and Y are provided with networks containing transistors $P_1$ and $P_2$, respectively. The emitters of these transistors $P_1$ and $P_2$ are connected to points of fixed potential too. The collectors are each connected via a separate resistor to a point of fixed potential. The bases are each connected to a separate circuit containing a capacitor, $C_4$ and $C_5$, respectively.

The left-hand plates of these capacitors $C_4$ and $C_5$ are each connected on one hand via a rectifier $G_{41}$ and $G_{42}$ and on the other hand via a resistor $R_{41}$ and $R_{42}$ to points of fixed potential. They are connected moreover via rectifiers, $G_{12}$ and $G_{13}$, respectively, to rails 1 and 2, respectively. The right-hand plates of these condensers $C_4$ and $C_5$ are each connected via a rectifier $G_{43}$ and $G_{44}$ to a point of fixed potential and via a second rectifier $G_{45}$ and $G_{46}$ to the bases of the associated transistor, which is also connected to the tapping point of a potentiometer $R_{42}$–$R_{43}$ and $R_{44}$–$R_{45}$.

The collectors of transistors $P_1$ and $P_2$ are connected via rectifiers, $G_{14}$ and $G_{15}$, respectively to the left-hand plate of a capacitor $C_6$.

This left-hand plate is connected on one hand via a resistor $R_{50}$ and on the other hand via a rectifier $G_{50}$ to points of fixed potential. The right-hand plate of the condenser $C_6$ is connected to a tapping on a potentiometer $R_{51}$–$R_{54}$ as well as to the rectifier $G_{16}$ to a tapping on a further potentiometer $R_{53}$–$R_{54}$ as well as to the base of a transistor Q, of which the emitter is connected again to a point of fixed potential and the collector via a rectifier $G_{17}$ to a point B. The point B is connected on one hand via a resistor $R_{55}$ and on the other hand via a rectifier $G_{18}$ and two resistors $R_{56}$–$R_{57}$ in series to points of fixed potential. The connecting point between the rectifier and this potentiometer $R_{56}$–$R_{57}$ is connected to the left-hand plate of a capacitor $C_7$, the right-hand plate of which is connected to a point of fixed potential.

The connecting point between the two resistors of potentiometer $R_{56}$–$R_{57}$ is connected to the base of a transistor R, of which the collector is connected to the above-mentioned rail conductor 4.

If the networks $P_1$ and $P_2$ and conductor rail 4 are left out of consideration for the moment, the following brief survey of the working of the distributor, which is known in itself can be given: In the initial state, transistors X and Y are non-conducting, and transistor Z is conducting, so conductor rails 1 and 2 have a negative potential with respect to conductor rail 3.

If there arrives a positive pulse at input terminal A, transistor Z becomes non-conducting, since rectifier $G_9$ is supplied with a negative potential, so capacitor $C_3$ will pass the positive pulse to the base of transistor Z. As a result of this transistor X will become conducting. The fact is that the positive pulse from input terminal A has no effect on it, because the left-hand plate of capacitor $C_1$ has already a positive potential via rectifier $G_1$. Due to the change-over to the non-conducting state of transistor Z, however, rectifier $G_3$ is from that moment on supplied with a negative potential; rectifier $G_2$ has already a negative potential. The potential of the base of transistor X falls, so that transistor X becomes conducting. Transistor Y remains non-conducting, because rectifier $G_5$ is provided with a negative voltage. The positive pulse appearing at terminal A is passed by capacitor $C_2$ to the base of transistor Y. Due to the change-over of transistor Z to the non-conducting state, rectifier $G_7$ is supplied with a negative potential (like rectifier $G_3$ mentioned above), but due to the change-over of transistor X to the conducting state, rectifier $G_6$ is supplied with a positive potential. Even after the disappearance of the positive pulse at the base of transistor Y, this transistor cannot become conducting, no more than transistor Z can, because rectifier $G_{10}$ is from then on supplied with a positive potential.

When the next positive pulse arrives at input terminal A of the distributor, transistor X becomes non-conducting and transistor Y conducting, whereas transistor Z remains non-conducting. Due to the arrival of a third positive pulse, the distributor reassumes the initial state.

The working of the networks in the lower part of the figure is as follows: At the first positive pulse arriving at input terminal A, transistor X becomes conducting, as a result of which there appears a positive voltage bound on rail 1. Consequently, a positive pulse is led via rectifier $G_{12}$ and capacitor $C_4$ to the base of transistor $P_1$, which is conducting normally, but which becomes non-conducting in this case for a period mainly determinal by the value of capacitor $C_4$. After this period, transistor $P_1$ becomes conducting again and delivers a positive pulse at its collector.

When the next positive pulse appears at terminal A of the distributor, transistor Y becomes conducting and via conductor rail 2, rectifier $G_{13}$ and capacitor $C_5$, a positive pulse is applied to the base of transistor $P_2$. This transistor $P_2$ too is conducting normally, but becomes non-conducting in this case for a period mainly determined by the value of capacitor $C_5$. The positive pulse appearing at the collector of transistor $P_1$ will have no effect, if before its appearance a second positive pulse has reached input terminal A already, since in that case rectifier $G_{15}$ from transistor $P_2$ is supplied with a negative potential.

If, however, the first positive pulse arriving at input terminal A is an isolated spurious pulse, the positive pulse appearing at the collector of transistor $P_1$ is led via rectifier $G_{14}$, capacitor $C_6$ and rectifier $G_{16}$ to the base of transistor Q. Transistor Q too is in the conducting state normally and becomes non-conducting for some time in this case. So in this period: no collector current flows via rectifier $G_{17}$, the potential of point B is decreased, and the potential of the base of transistor R is decreased in consequence. Transistor R becomes conducting, thereby delivering a positive pulse to rail conductor 4. As a result of this, transistors X and Y are put in the non-conducting state via rectifiers $G_4$ and $G_8$, so that transistor Z assumes the conducting state, since its base potential is no longed increased via rectifiers $G_{10}$ and $G_{11}$. The distributor has returned to its initial state. Transistor Q becomes conducting again and after a delay determined by the value of capacitor $C_7$ and the reverse resistance of rectifier $G_{18}$, transistor R becomes non-conducting. Yet transistors X and Y are kept in the non-conducting state via rectifiers $G_3$ and $_7$, respectively, until a fresh positive pulse is received at input terminal A.

If, however, there arrives at terminal A an isolated spurious impulse pair, not the positive pulse from the collector of transistor $P_1$, but the one from the collector of transistor $P_2$ will be passed to the base of transistor Q, as a result of which the distributor returns to the initial state. The return to the initial state should be effected after a period following the spurious pulses which is longer than the longest interval occurring between two successive normal pulses. The values of condensers $C_4$ and $C_5$ should be chosen accordingly.

It will be clear that distributor stages and networks may also be composed with the aid of npn transistors or tubes. Further the arrangement may be such that in each state of the distributor more than one tube or transistor is conducting.

If e.g. a five-stage distributor has in each state two conducting pnp transistors, the rail connected to transistor R should be connected via rectifiers to input terminals of the three distributor stages that have a non-conducting transistor in the initial state of the distributor.

If an $n$-stage distributor is wanted that can still return to its initial state after a series of $n-1$ spurious pulses, $n-1$ networks containing e.g. pnp-transistors $P_1 \ldots P_{n-1}$ are required. The network containing transistor $P_1$ belongs then to the stage in which the pnp-transistor passes from the non-conducting state to the conducting state at the first positive pulse arriving at input terminal A in the initial state of the distributor.

While I have illustrated and described what I regard to be the preferred embodiment of my invention, nevertheless it will be understood that such is merely exemplary and that numerous modifications and rearrangements may be made therein without departing from the essence of the invention, I claim:

1. A self re-setting counter circuit comprising:
   (A) a distributor having
      (*a*) $n$ stages each having two conductive states, and
      (*b*) conductor means interconnecting said stages,
   (B) less than $n$ networks each having
      (*a*) two conductive states,
      (*b*) a time delay circuit, and
      (*c*) a connection to a corresponding one of said distributor stages; and
   (C) a gating re-set circuit means controlled only by said networks to re-set all said stages in said distributor in their initial condition provided said distributor has not been brought into its next position within a predetermined time determined by the time delay circuit in one of said networks.

2. A counter according to claim 1 wherein each of said stages and each of said networks and said gating circuit includes a transistor.

3. A counter according to claim 1 wherein said time delay circuits comprise resistor-condenser circuits.

4. A self re-setting impulse counter circuit comprising:
   (A) a distributor having
      (*a*) $n$ stages each having
         (1) two conductor states,
         (2) an input, and
         (3) an output,
      (*b*) conducting means to connect the input of each stage to the output of the previous stage in rotation, and (c) a common input connection to the input of each stage for the impulses to be counted;

(B) less than $n$ networks each having (a) two conductive states, (b) a time delay circuit, and (c) a connection to a corresponding one of the outputs of said distributor stages; and (C) a gating re-set circuit means having (a) an input terminal connected to and controlled by said networks, and (b) an output terminal connected to each of said less than $n$ stages corresponding to said less $n$ networks of said distributor to re-set all of said stages in said distributor in their initial condition provided said distributor has not been brought into its next position within a predetermined time determined by the time delay circuit in one of said networks.

5. A counter circuit according to claim 1 wherein there are $n-1$ networks.

6. A counter circuit according to claim 4 wherein there are $n-1$ networks.

References Cited by the Examiner

UNITED STATES PATENTS

| | | | |
|---|---|---|---|
| 2,521,774 | 9/50 | Bliss | 328—48 |
| 2,767,313 | 10/56 | Martinelli | 328—48 |
| 2,964,657 | 12/60 | Page | 307—88.5 |
| 2,972,718 | 2/61 | Alperin et al. | 328—48 |
| 3,079,554 | 2/63 | Ranky | 328—48 |

JOHN W. HUCKERT, *Primary Examiner.*

HERMAN KARL SAALBACH, *Examiner.*